US009542871B1

(12) United States Patent
White et al.

(10) Patent No.: US 9,542,871 B1
(45) Date of Patent: Jan. 10, 2017

(54) COLLAPSIBLE SIGN POST APPARATUS

(71) Applicants: James Timothy White, Melbourne, FL (US); Andrew David Easler, Melbourne, FL (US)

(72) Inventors: James Timothy White, Melbourne, FL (US); Andrew David Easler, Melbourne, FL (US)

( * ) Notice: Subject to any disclaimer, the term of this patent is extended or adjusted under 35 U.S.C. 154(b) by 0 days.

(21) Appl. No.: 15/076,446

(22) Filed: Mar. 21, 2016

(51) Int. Cl.
*F16M 13/00* (2006.01)
*G09F 13/02* (2006.01)
*G09F 15/00* (2006.01)
*A45F 3/44* (2006.01)
*G09F 7/18* (2006.01)

(52) U.S. Cl.
CPC ............. *G09F 15/0075* (2013.01); *A45F 3/44* (2013.01); *G09F 7/18* (2013.01); *G09F 15/0068* (2013.01); *G09F 2007/1804* (2013.01); *G09F 2007/1856* (2013.01)

(58) Field of Classification Search
CPC .......... G09F 15/00; G09F 15/02; G09F 13/02; G09F 7/18; G09F 15/0068; E01F 9/602; E01F 9/65; A45F 3/44
USPC ............ 248/124.1, 156, 218.4, 219.2, 219.3, 530,248/532, 533, 545; 40/606.01, 607.01, 607.02, 40/607.03, 607.05, 607.1, 607.11, 610; 256/19, DIG. 5
See application file for complete search history.

(56) References Cited

U.S. PATENT DOCUMENTS 1,335,302 A * 3/1920 Stout ........................ E04H 17/06 248/548
4,183,695 A * 1/1980 Wilcox ................... E01F 9/635 40/607.1
4,249,715 A * 2/1981 Repp ....................... E01F 9/685 248/156
4,278,228 A * 7/1981 Rebentisch ............ F16M 13/00 248/548
4,327,514 A * 5/1982 Bourque .................. G09F 7/18 40/606.19
4,825,575 A 5/1989 Rethke
4,843,746 A * 7/1989 DesNoyers ............... G09F 7/18 248/156

(Continued)

OTHER PUBLICATIONS amazon.com, 4ever, Vinyl PVC Real Estate Sign Post—White (Item listed for sale on-line), May 17, 2016. Link:http://www.amazon.com/Vinyl-Real-Estate-Sign-Post/dp/B0046VYXFW/ref=Ip__5298069011_1_3?s=kitchen&ie=UTF8&qid=1456592715&sr=1-3.

(Continued)

*Primary Examiner* — Tan Le
(74) *Attorney, Agent, or Firm* — Reem Allos

(57) ABSTRACT

A sign post assembly including a ground stake, vertical post, a horizontal arm, and a cap, wherein the vertical post is pin join connected with the horizontal arm by means of a fastener allowing the horizontal arm and the vertical post to be arranged in parallel arrangement during disassembly and storage, or in perpendicular arrangement during assembly and fully extended status. The vertical post having a cut-out along its top portion to allow the arrangement of the horizontal arm within the vertical post's inner cavity and the vertical post having a cut-out along at least one of its vertical sides to allow alignment of the horizontal arm within its internal cavity wherein the horizontal arm collapses downward into the vertical post. Disassembly includes inserting the stake (along with other assembly components (i.e. sign clips, removable fasteners, etc.) within the inner cavity of the lower portion of the vertical post.

19 Claims, 12 Drawing Sheets

(56) References Cited

U.S. PATENT DOCUMENTS

| | | | | |
|---|---|---|---|---|
| 5,833,181 | A * | 11/1998 | DesNoyers | E04H 12/2215 248/545 |
| 5,903,991 | A | 5/1999 | Sasse | |
| 6,076,787 | A * | 6/2000 | Troyer | A47B 23/04 248/166 |
| 6,220,776 | B1 * | 4/2001 | Reeves | A63B 63/004 403/102 |
| 8,689,938 | B2 * | 4/2014 | Kenton | E04G 21/3233 182/113 |
| 9,262,948 | B2 | 2/2016 | Pounders | |
| 2006/0042138 | A1 | 3/2006 | Lavelle | |
| 2011/0308990 | A1 * | 12/2011 | Pounders | E04H 12/2215 206/525 |
| 2014/0345176 | A1 | 11/2014 | Okert | |

OTHER PUBLICATIONS

4everproducts.com, Company Website, White Vinyl RE Post (Item listed for sale on-line), May 17, 2016. Link: http://www.4everproducts.com/white-vinyl-real-estate-post/.

4everproducts.com, Company Website, Instructional Videos (Videos), May 17, 2016. Link: http://www.4everproducts.com/white-vinyl-real-estate-post/.

lowen.com, Company Website, Real Estate Aluminum Sign Post With Ground Anchor (Item listed for sale on-line), May 17, 2016. Link: http://www.lowensign.com/realestatesigns/realliving/products/item/12-505/real+estate+aluminum+sign+post+with+ground+anchor%2C+18-inch-x24-inch-+panel+-+white.html.

Lowen Corporation,How to Install a Premier Post from Lowen Sign Company (Video), May 17, 2016. Lnk: https://www.youtube.com/watch?v=YGHMP-uu_0Y&feature=youtu.be.

* cited by examiner

Fig. 13
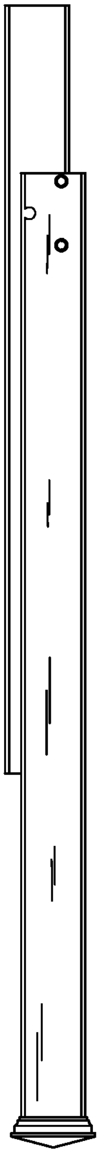
Fig. 14
Fig. 15
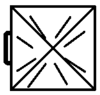

Fig. 20
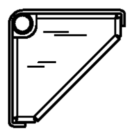
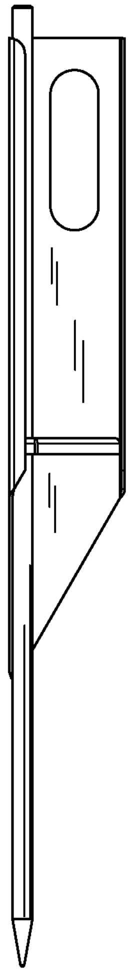
Fig. 21
Fig. 22

COLLAPSIBLE SIGN POST APPARATUS

FIELD OF THE INVENTION

This invention relates generally to the field of real estate advertising signs specifically real estate sign posts intended for lawn installation for hanging a realty (or "for sale") sign.

BACKGROUND OF THE INVENTION

In real estate and other fields, it is useful to have a noticeable sign in the front yard for informing the public that that property or product stored at that location is available for purchase. Today, real estate yard signs are manufactured from 4×4 inch sections of lumber joined to form a vertical post and horizontal top arm. In addition, there are real estate signs manufactured using 4×4 inch section of PVC plastic joined to form a vertical post and horizontal post which require much time and effort, many components in order to assemble, disassemble, and transport.

Typically, signs with the real estate company's name and listing agent swing from two hooks positioned on a ring or hook secured to the bottom of that horizontal arm. "Open House", "Sale Pending" or other information may be placed atop the arm.

Current 4×4 inch lumber posts are rather heavy and bulky to transport, especially when pre-connected (or otherwise joined into one assembly). Moreover, lumber posts are required to be painted constantly and cannot be transported by compact vehicle for installation and removal by an agent. Professional installers are usually contracted to perform such on site installations and removals.

More recently, alternate post signs have been manufactured from lighter gauge metal tubing and plastic (e.g., PVC), often in the cross-sectional shape of a square. Such signposts have been installed by digging and setting the vertical post in place, or by driving stakes through a holding bracket/tube onto which is mounted the vertical post component.

These alternate sign posts manufactured from plastic PVC require meticulous assembly, sometimes requiring multiple individuals working together in order to assemble, of their respective components from the stake installation, the connectivity of the vertical post to the horizontal arm, and installation of small fastening components in order to assemble the real estate advertising sign onto the horizontal arm. Moreover, upon disassembly, it's equally frustrating for the user(s) to uninstall the connection between the vertical post component and the horizontal arm, remove the stake from the ground, and uninstall small components required for secure assembly of the real estate sign post, fit all these components into an external transport mechanism for transpiration within a vehicle, and later installation at a second destination.

In some instances, these plastic PVC real estate sign posts are shared between real estate agents within a brokerage firm, and in most cases, the installation instructions are missing, and it makes installation and disassembly more frustrating than one would imagine because all the major pieces are separated and the fasteners are sometimes missing, sometimes due to absentmindedness or lack of reliable transport mechanism used by the previous user. In some cases, these plastic real estate sign posts utilize a proprietary locking mechanism to hold the vertical post component with the horizontal arm, which if is missing, results in inability to use the sign post altogether.

A need therefore exists for a lightweight real estate sign post which can be assembled quickly and easily without much written instructions that can easily be disassembled and securely transported by compact vehicle for later usage.

SUMMARY

One preferred embodiment of the disclosure is a real estate sign post assembly comprising: a ground stake, vertical post component, a horizontal arm component, and a cap, wherein the vertical post component is pin join connected with the horizontal arm by means of a fastener allowing the horizontal arm and the vertical post component to be arranged in parallel arrangement during disassembly and storage, or in perpendicular arrangement during assembly and fully extended status. In essence, a lightweight sign post apparatus which may collapse in on itself for easy transport, but remained one continuous piece for easy assembly and disassembly. Additionally, an assembly slot exists in close proximity to the pin join connecting the horizontal arm to the vertical post member which allows the use of a removable fastener to maintain the horizontal arm in perpendicular arrangement with the vertical post component. Also, a disassembly slot exists in close proximity to the pin join connecting the horizontal arm to the vertical post member which allows the use of a (same or different) removable fastener used in the assembly slot to maintain the horizontal arm in parallel arrangement with the vertical post component. Moreover, the ground stake couples with the lower portion of the vertical post component in order to steadily arrange the real estate sign post in an upright position. Furthermore, the horizontal arm includes two moveable clips, which allow for quick re-arrangement of their position along the lower side of the horizontal arm for which an advertising sign may hang or attach thereto. In addition, the real estate sign post includes a cap which may be arranged along the top portion of the vertical post component for ornamental purpose, or alternatively be arranged along the lower portion of the vertical post component to securely maintain assembly component (i.e. a ground stake, sign clips, removable fasteners, etc) within the inner cavity of the real estate sign post. Additionally, the vertical post component has a cut-out along its top portion to allow the arrangement of the horizontal arm to be horizontally arranged within the vertical post component's inner cavity. Also, the vertical post component has a cut-out along at least one of its vertical sides to allow proper alignment of the horizontal arm within its internal cavity wherein the horizontal arm collapses downward into the vertical post component.

In another embodiment of the disclosure, a ground stake assembly comprising: a nail member, at least two vertical support members having a rectangular upper portion and a triangular bottom portion, at least inward side components arranged along the outer ends of the two vertical support members, and a horizontal support component fitted in within the cavity occupied by the two vertical support members and inward side components. The nail member having a dull and a sharp side, wherein the sharp side is intended to be buried in the ground and the dull end intended to be enclosed within the lower portion of the vertical support component. The nail extending the entire length of the stake and having the two vertical support members extending outward from the upper half of the nail, the two vertical support members having cut-out to allow a user to grasp the stake easily for installation or removal. The two vertical support members, each having an inward side component extending at an acute angle inward in parallel arrangement along the outer sides of the vertical support member. Lastly, the two vertical support members having a horizontal support member at 90 degree's alignment thereto, residing within the space occupied between the two vertical support members and the two inward side components. The vertical support members having a triangular bottom portion intended to be buried in the ground, and a rectangular upper portion intended to be enclosed and fitted with the lower portion of the vertical post component.

BRIEF DESCRIPTION OF THE DRAWINGS

These and other features will now be described with references to the drawings summarized below. These drawings and the associated description are provided to illustrate a preferred embodiment of the invention, and not to limit the scope of the invention.

FIG. 13 is a top view of the sign post apparatus during disassembled state FIG. 14 is a back view of the sign post apparatus during disassembled state FIG. 15 is a bottom view of the sign post apparatus during disassembled state FIG. 20 is a top view of the ground stake apparatus FIG. 21 is a front right side view of the ground stake apparatus FIG. 22 is a bottom view of the ground stake apparatus

DETAILED DESCRIPTION

Figure 1A:
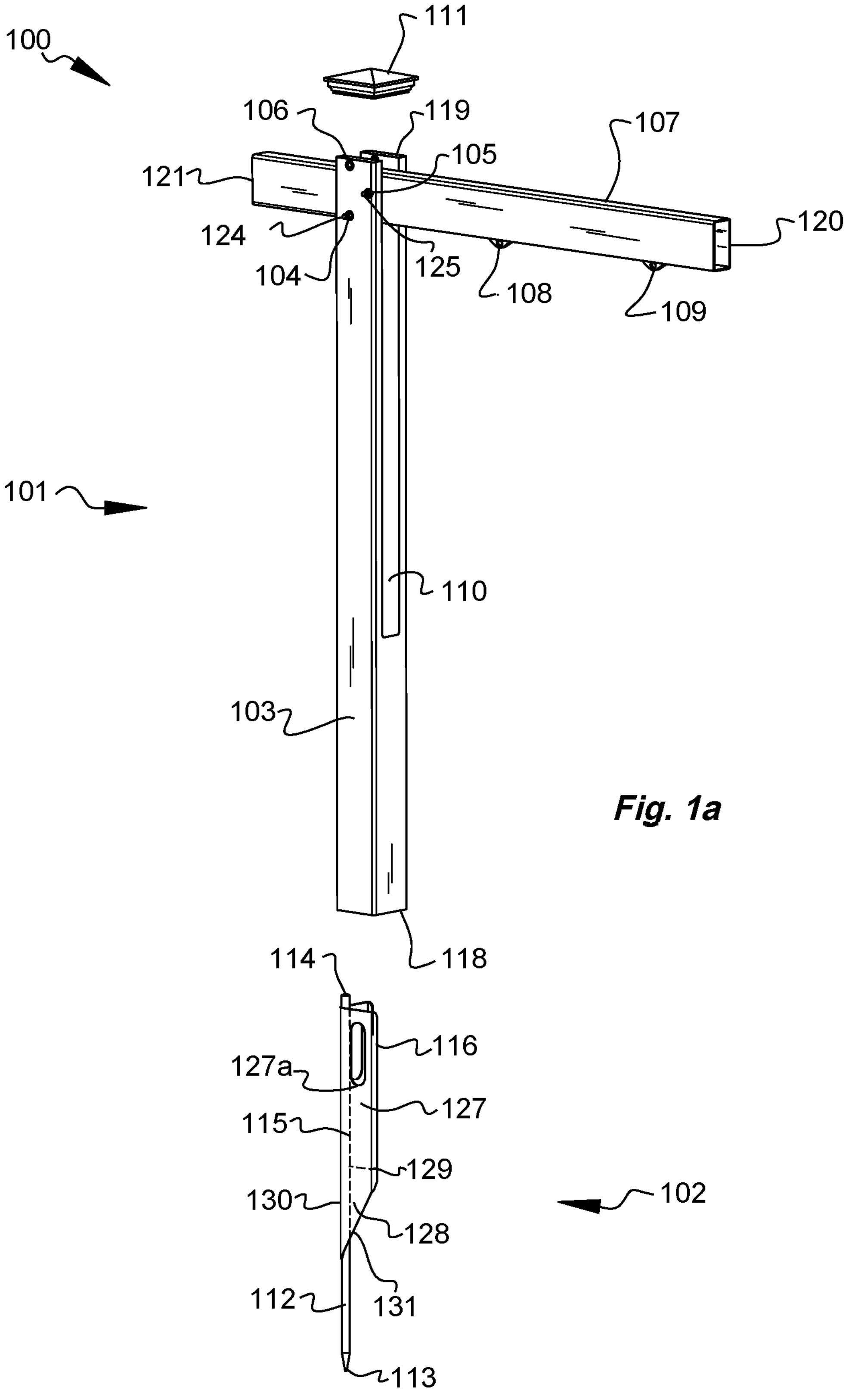
FIG. 1*a* is a prospective view of the sign post apparatus wherein the cap, sign post body, and stake are each fully shown for assembly.

One non-limiting advantage of the described sign post apparatus is a lightweight, durable, and weather resistant sign post apparatus which may collapse in on itself for easy transport, but remained one continuous piece for easy assembly and disassembly, wherein the user may quickly install a ground stake, extend a horizontal arm pin-joint connected to a vertical post into position, fasten at minimum one assembly fastener and place the vertical post over top of the stake for reliable and sturdy installation.

Another non-limiting advantage of the described sign post apparatus is a lightweight sign post that can be disassembled, collapsed, and stowed away all installation components into a neat and compact design for easy storage and transportation.

Exemplary embodiments of the disclosure are described below in further detail in connection with FIGS. 1-25.

Specific embodiments of the invention will now be described with reference to the drawings. These embodiments are intended to illustrate and not limit the present invention. In accompanying drawings, common elements are commonly numbered in the respective views. Numeric identifiers are provided below as a quick reference guide.

100 fully assembled real estate sign post;
101 real estate sign post;
102 stake
103 vertical post
104 permanent slot
105 assembled slot
106 disassembled slot
107 horizontal arm
108 inner clip
109 outer clip
110 rectangular cut out
111 cap
112 nail
113 sharp end of nail
114 dull end of nail
115 vertical support
116 inward side
117 horizontal support
118 lower end of vertical post
119 top end of vertical post
120 front end of horizontal arm
121 backend of horizontal arm
124 permanent Pin
125 assembled Fastener
126 disassembled Fastener
127 rectangular top portion of vertical support member 115
127A rectangular top portion cut-outs of vertical support member 115
128 triangular bottom portion of the vertical support member 115
129 base member of the triangular bottom portion 128
130 height member of the triangular bottom portion 128

131 hypotenuse member of the triangular bottom portion 128

132 backend rectangular cut-out (cut-out along upper cavity of top portion of 103)

FIG. 1*a* illustrates components of the fully assembled sign post 100. In one embodiment of the disclosure, a fully real estate sign post 100 having a real estate sing post body 101, a cap 111, and a stake 102. In one embodiment, a sign post body 101 comprising a vertical post 103 having a rectangular cut-out 110 to allow a horizontal arm 107 to be slid-able fit inside the rectangular cut-out 110 upon the disassembly of the sign post body 101. In one embodiment, a vertical post 103 having a rectangular cut-out 110 to permit a horizontal arm 107 to fold downward into the rectangular cut-out 110 during disassembly or fold upward from the rectangular cut-out 110 during assembly. The vertical sign post 103 may be a square, round, or rectangular hollow tube member made of PVC plastic or alternative durable and lightweight plastic materials, or lightweight metallic material, such as aluminum for example, capable of withstanding extreme outdoor weather conditions such as rain, hail, snow, extreme heat, etc, and allowing for easy installation, disassembly, transport and storage. In one embodiment, the top end of vertical post 119 having a top portion rectangular cut-out 110 to allow the insertion of the horizontal arm 107 within the center cavity of the top end of the vertical post 119 so as to allow the horizontal arm 107 to be in position, wherein the top end of the vertical post 119 intersects the horizontal arm 107 at approximately one third length of the horizontal arm 107 measured from the backend of the horizontal arm 121, allowing the two third of the horizontal arm 107 to extend forward towards the frontend of the horizontal arm 120. In one embodiment, the horizontal arm 107 fits within a top rectangular cut-out 110 within the vertical post 103. In one embodiment, the vertical post 103 may be comprised of a 4×4 square, hollow, PVC plastic measuring relatively 60 inches in length. Alternative embodiments of vertical sign post 103 are inherently implied that sufficiently correspond to the embodiment described and illustrated in the figures.

In one embodiment, a vertical sign post measuring 60 inches in length, and having a rectangular cut out measuring 38"×2⅓2" measured from the top end of the vertical post 119. In one embodiment, the vertical sign post 103 having a solid backside (not shown), whereby the vertical sign post 103 has three solid sides, and one rectangular cut-out side, with the exception of having a two sided upper portion above where the horizontal arm 107 intersects the vertical post 103 and two rectangular cut-out portions of different sizes both in front and the back side of the vertical sign post 103 to allow the placement of the horizontal arm 107 onto the top end of the vertical sign post 119. In another embodiment, the vertical sign post 103 having a four sided lower portion and a two sided upper portion, whereby the rectangular cut-out 110 extends both in front and the back side of the vertical sign post 103. In one embodiment, the vertical sign post having at least one pre-drilled hole(s) (i.e. permanent slot 104, assembly slot 105, and disassembly slot 106) which penetrate both the vertical sign post 103 and the horizontal arm 107 configured for receipt of a permanent fastener 124, an assembly fastener 125, and disassembly fastener 126 respectively. The pre-drilled hole(s) may be configured along the top end of vertical post 119, wherein the permanent slot 104 may arranged along the bottom-outward side, the assembly slot 105 may be arranged along the middle-inward side, and the disassembly fastener 126 arranged along the upper-outward side with respect to the vertical sign post 103 and the horizontal arm 107.

In one embodiment, a horizontal arm 107 with dimensions of 2 in.×4 in. a rectangular, hollow, PVC plastic measuring relatively 48 in length. The horizontal arm 107 having a top side with a flat surface, a bottom side with a substantially flat surface and placement of moveable sign clips (i.e. internal sign clip 108, and external sign clip 109) embedded therein. The internal sign clip 108 may be a moveable sign clip allowing an external user to configure the placement of the internal sign clip 108 between a defined inner portion of the bottom side of the horizontal arm 107 to allow the attachment of signs having varying lengths. The external sign clip 109 may be a moveable sign clip allowing an external user to configure the placement of the external sign clip 109 between a defined outer portion of the bottom side of the horizontal arm 107 to allow the attachment of signs having varying lengths. In one embodiment, the frontend of horizontal arm 120 of the horizontal arm 107 having a flat side. In one embodiment, the backend of horizontal arm 121 of the horizontal arm 107 having a flat side. The horizontal arm 107 having at least one pre-drilled hole(s) (i.e. permanent slot 104, assembly slot 105, and disassembly slot 106) as previously described and illustrated in FIG. 1*a*.

In one embodiment, the vertical sign post 103 is coupled with the horizontal arm 107 by a permanent fastener 124 fitted into a permanent slot 104 arranged along the top side of the vertical post 119. In another embodiment, the permanent fastener 124 may be a pin-join assembly wherein the pin holding the vertical sign post 103 and the horizontal arm 107 is not removable. In yet another embodiment, the permanent fastener 124 may be a bolt and nut configuration, a fast pin configuration, or alternative fastener mechanism, wherein the fastener mechanism is removable. The disclosure contemplates that the permanent slot 104 is engaged with a permanent fastener 124 when the sign post body 101 is fully extended during assembly. Alternatively, the disclosure contemplates that the permanent slot 104 is engaged with a permanent fastening 124 when the sign post body 101 is fully collapsed during disassembly.

In addition to the permanent slot 104, the vertical post 103 includes an assembled slot 105 constructed to accept a removable fastener mechanism, in example, a fast clip, or a bolt and nut assembly configuration. When the vertical sign post 103 is arranged vertically and the horizontal arm 107 is arranged horizontally, the permanent fastener 124 in place, an external user may insert an assembly fastener 125 comprising a removable fastener mechanism into an assembled slot 105 in order to maintain the horizontal arm 107 into a fixed extended (open/assembled) position. FIG. 1*a* illustrates the relative positions where the permanent fastener 124 and the assembly fastener 125 are to be arranged within the sign post body 101. In the most basic terms, the permanent slot 104 may be located towards the bottom outside (back) corner, the assembled slot 105 is located towards the upper inside (front) corner, and the disassembled slot 106 (to be discussed below) may be located in the upper outside (back) corner along the top side of the vertical post 119. During disassembly, an external user may remove the assembly fastener 125 fold down the horizontal arm 107 into the rectangular cut-out 110 of the vertical post 103, in order to collapse the sign post body 101 into a closed or disassembled position, while still maintaining the permanent fastener 104 to which holds both the vertical post 103 and the horizontal arm 107 joint together.

In addition to the permanent slot 104 and assembly slot 105 explained above, a vertical post 103 may also include a disassembly slot 106 used to lock the vertical post 103 and horizontal arm 103 into closed or disassembled position by use of a disassembly faster 126. The disassembly fastener 126 may be a bolt and nut assembly configuration, a fast clip assembly configuration, or any alternative fastening mechanisms known in the art. Typically, when the disassembly fastener is engaged, then it's implied that the assembly fastener 125 has been removed. Moreover, when a disassembly faster is engaged, the permanent fastener 124 (i.e. pin join fastening mechanism) is still engaged. Moreover, the disassembly fastener 126 may be removed from the disassembly slot 106 and allow the sign post body 101 to extend outward into an open fully assembled position, allowing the horizontal arm 107 to fold upward and outward from within the vertical post 103, but in order to keep the sign post body in a open fully assembled position, an assembly fastener 125 needs to be used within the assembly slot 105.

In one embodiment of the disclosure, a dual purpose cap 111. In one embodiment, a dual purpose cap 111 intended to be placed on the top end of the vertical post 119 for aesthetic purposes to give the sign post body 101 a more professional polished look. The cap is designed to fit comfortably on the top end of the vertical post 119 when the sign post body is fully extended in the assembled position. Alternatively, the cap is designed to fit comfortably and securely on the lower end of the vertical post 118 when the sign post body is disassembled. During disassembly and storage, the stake 102 may be inserted into the hollow inner lower cavity of the vertical post 103, and the cap acts as a secure top to keep the stake in place. The cap 111 may have a shape that fully integrates with the shape of the vertical sign post 103. In one embodiment, the cap 111 may be a square shaped cap 111, but alternative shapes are contemplated and implied in this disclosure, such as a round, elliptical, rectangular, triangular, pentagon, octagon, etc. shaped cap 111 which may alternatively be manufactured to fit comfortably with a vertical sign post 103 having equivalent external (shape) characteristics.

The fully assembled real estate sign post 100 may be installed and fixed into the ground by first inserting into the ground a ground support means or stake 102. The stake 102 may have a nail member 112, a sharp end of nail member 113, a dull end of nail member 114, a vertical support member 115, an inward side support member 116, and a horizontal support member 117. The stake 102 will generally be installed into the ground wherein the sharp end of nail member 113 is pointed downward and the dull end of nail member 114 is pointed upward. The stake 102 is placed into the ground, and an external user applies force, typically by means of a hammer, to position the stake 102 into the ground to provide stable support mechanism for the sign post body 101 to be placed over top of the stake. Generally, the stake 102 will be positioned into the ground, wherein a bottom portion of the stake will be buried and a top portion of the stake will be exposed intended for coupling with the vertical post 103 to maintain upright position of the sign post body 101.

In one embodiment of the disclosure, the vertical support members 115 and the inward side members 116 of the post provide a secure and balanced fit by locking into tight position upon two opposite corners of a vertical sign post 103 along the lower end of the vertical post 118. The two vertical sign members 115 residing at perpendicular angles from one another provide support to hold the vertical sign post 103 upright and steady during assembly due to the vertical sign members 115 anchored into position into two opposite side corners of the vertical sign post. The two inward side members 116 of the stake 102 are arranged in a perpendicular and parallel manner with respect to each of the vertical support members 115 and provide further support for stability of the vertical sign post 103 during assembly. The inward side members 116 are a support mechanism and encourage stable and fixed installation of the fully assembled sign post 100. Each inward side member 116 is situated at the outward side of its respective vertical support member 115.

Moreover, the stake 102 may include a vertical support member 115 having a rectangular top portion 127 and a triangular bottom portion 128, wherein the bottom portion 128 is intended to be substantially buried within the ground upon stake installation and the bottom side of the rectangular top portion 127 is to be substantially flush or even with the ground. The stake 102 has a horizontal support member 117 which is intended to provide further fixed support during stake installation and also provide the user with an indication that the stake has been properly and sufficiently installed into the ground. Furthermore, the horizontal support member 117 does not permit the stake 102 to be further inserted into the ground after the ground is flush or even with the horizontal support member. Also, the horizontal support member 117 acts much like a gate disallowing further burial of the stake 102 into the ground if the horizontal support member 117 is touching the ground.

The rectangular top portion 127 of the vertical support member 115 may have oval, rectangular, or other similar shaped cut-outs 127A to allow the user to grasp or hold the stake while applying external force to bury the stake 102 into the ground. In one embodiment of the disclosure, the rectangular top portion 127 is intended to be above ground and fit tightly inside the lower end of vertical post 118 upon installation.

The triangular bottom portion 128 of the vertical side members 115 is design to facilitate the quick or easy installation of the stake 102 into the ground when the user applies external downward force to bury the stake into the ground. The triangular bottom portion 128 having a triangular configuration wherein the base member 129 of the triangle is horizontal and flush with the bottom side of the rectangular top portion 127 of the vertical support member 115, the height member 130 of the triangle is flush with the nail member 112, and the hypotenuse member 131 is angled downward from the outside side of the base member 129 or bottom outside side of the rectangular top portion 127 angled inward towards the end point of the height member 130 along the bottom side of the nail 112.

Figure 1B:
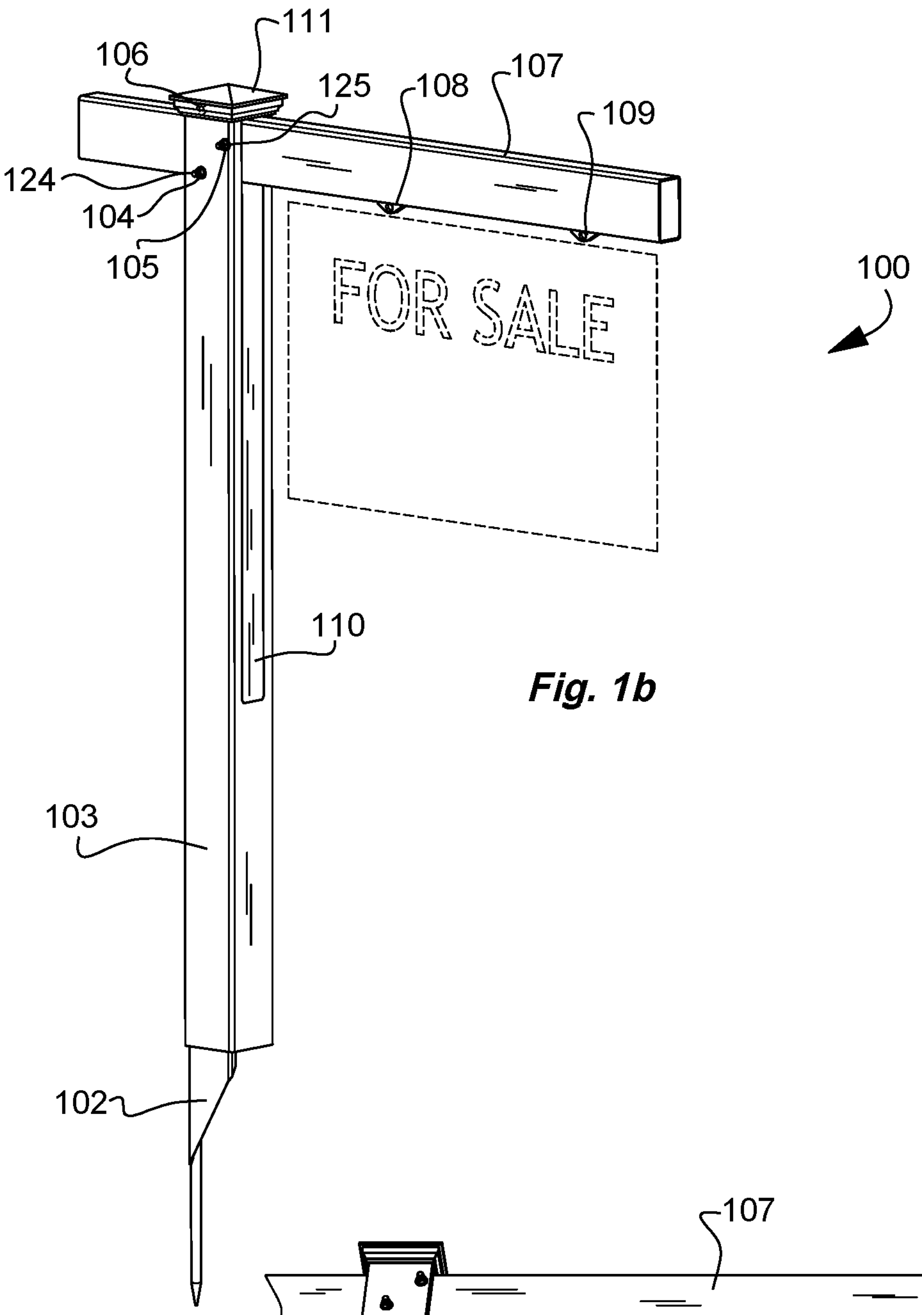
FIG. 1*b* is a prospective view of the sign post apparatus wherein the cap, sign post body, and stake are shown as assembled.

FIG. 1*b* illustrates an embodiment of the collapsible sign post assembly in an "assembled" state. In one embodiment of the disclosure, a vertical sign post 103 coupled with a stake 102 along it's lower end of vertical post 118 having a permanent slot 104 configured to receive a permanent fastener 124, an assembly slot 105 configured to receive a assembly fastener 125 in order to maintain a horizontal arm 107 in an horizontal (assembled) position whereby the moveable sign clips including an internal clip 108 and external clip 109 are aligned along the bottom side of the horizontal arm 107, and the disassembly slot 106 is covered up by the cap 111 along the top end of the vertical post 119. The internal clip 108 and external clip 109 are configured to attach to a sign by attachment means known in the art, such as S hooks, S clips, or other clip or attachment mechanism. In an alternative embodiment, the internal clip 108 and external clip 109 are removable and can be removed prior to disassembly, and inserted into place during assembly of the horizontal arm to allow a closer alignment of the horizontal arm 107 into the vertical post 103. Upon disassembly, the cap 111 is removed from the top end of vertical post 119, the assembly fastener 124 removed, the horizontal arm 107 lowed (folded down) into the rectangular cut-out 110 within the vertical post 103, and a disassembly fastener 126 inserted into the disassembly slot 106 to lock the vertical post 105 and horizontal arm 107 in place. Moreover, upon disassembly, the stake 102 as shown in FIG. 1*b* will be turned 180 degrees around whereby the sharp end of nail 113 is pointed upward and the dull end of nail is pointed downward, and the stake inserted into the inner cavity of the lower end of vertical post 118, covered by the cap 111 to keep securely the stake in place within the vertical sign post 103.

Figure 1C:
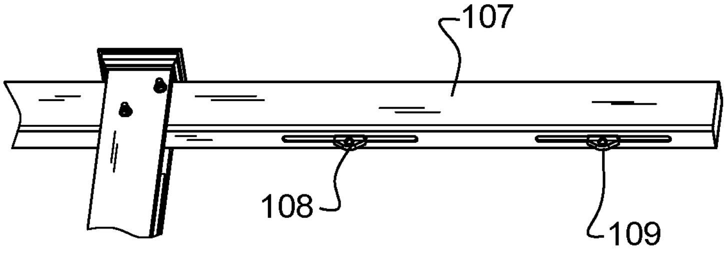
FIG. 1*c* is a prospective view of the sign post apparatus wherein the moveable clips are shown.

FIG. 1*c* illustrates a prospective view of the sign post apparatus wherein the moveable clips are shown. In one embodiment of the disclosure, the inner clip 108 may be capable of movement along a fixed track arranged parallel along the horizontal arm 107 to allow the inner clip 108 capability to move to the right or left to adjust to fit advertising signs which hang below and attached to the inner clip 108. In another embodiment of the disclosure, the outer clip 109 may be capable of movement along a fixed track arranged parallel along the horizontal arm 107 to allow the outer clip to move to the right or left to adjust to fit advertising signs which hang below and attached to the inner clip 108. In another embodiment of the disclosure, both the inner clip 108 and the outer clip 109 have their own fixed track arranged along the horizontal arm 107 to allow each of the inner clip 108 and outer clip 109 capability to move to the right or left to adjust to fit advertising signs which hang below and attached to the inner clip 108 and outer clip 109.

Figure 2:
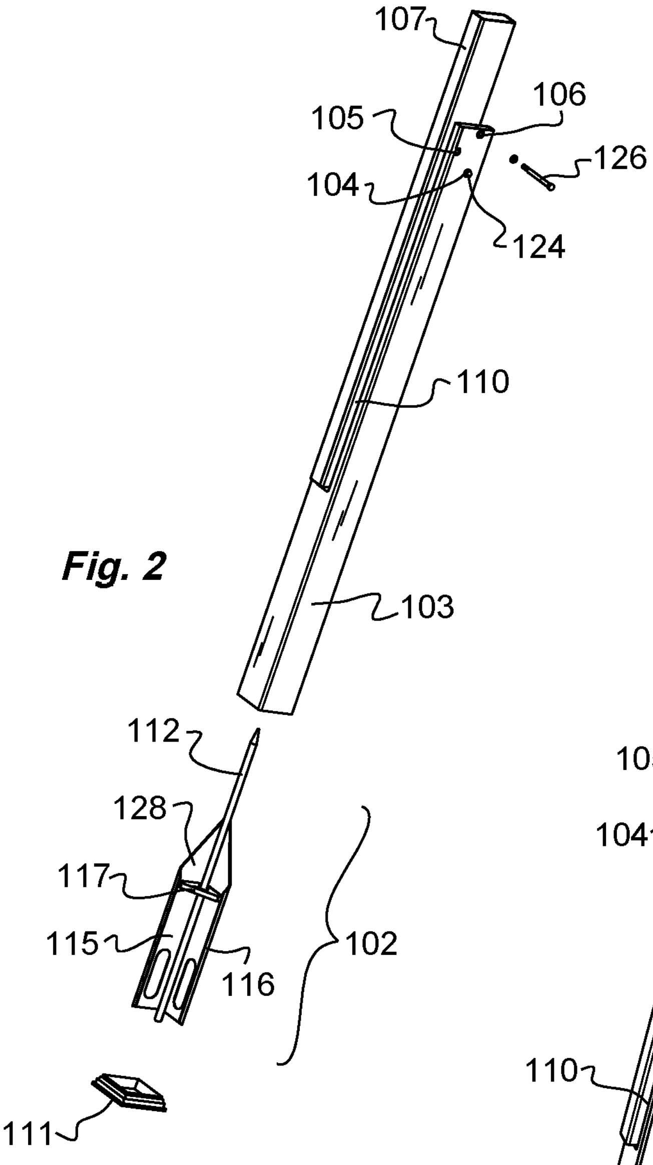
FIG. 2 is a prospective view of the sign post apparatus wherein the sign post body, stake, and cap are each shown as fully disassembled in preparation for storage or transport.

FIG. 2 is a prospective view of the sign post apparatus wherein the sign post body, stake, and cap are each shown as fully disassembled in preparation for storage or transport. In one embodiment of the disclosure, the assembly slot 105 is vacant or empty, the permanent slot 104 fitted with a permanent fastener 124, and the disassembly slot 106 fitted with a disassembly fastener 126. As shown in FIG. 2 the horizontal arm 107 is collapsed downward into the vertical post 103 within the rectangular cut-out 110 portion. In one embodiment of the disclosure, the stake 102 may fit into the inner cavity of the lower end of vertical post 118 sharp end of nail pointed up (as shown), or sharp end of nail pointed down (not shown). Lastly, the cap 111 is placed into tight fit locking position along the lower end of vertical post 118 in order to keep the stake 102 in place.

Figure 3:
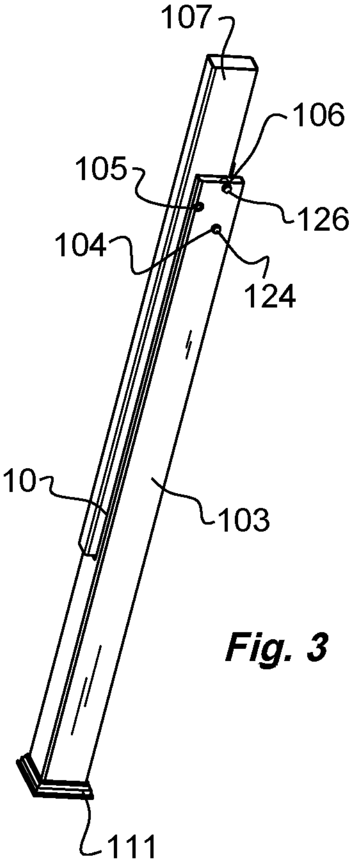
FIG. 3 is a prospective view of the sign post apparatus when fully disassembled and ready for storage or transport.

FIG. 3 is a prospective view of the sign post apparatus when fully disassembled and ready storage or transport. As shown in FIG. 3 the sign post apparatus is fully disassembled, whereby the stake is enclosed within the internal cavity of the vertical post 103 and kept in place by using the cap 111 as an encapsulation mechanism. As shown, the horizontal arm 107 is collapsed into the rectangular cut-out 110 of the vertical post 103. In one embodiment, the horizontal arm 107 may collapsed into a flush position with the vertical post 103 (not shown), or the horizontal arm 107 may collapse into a almost flush position with the vertical post (as shown), whereby a portion of the horizontal arm is protruding outward from the rectangular cut-out 110 along the vertical post 103 upper portions. As described in FIG. 2, the assembly slot 105 is vacant or empty, the permanent slot 104 fitted with a permanent fastener 124, and the disassembly slot 106 fitted with a disassembly fastener 126. In another embodiment of the disclosure, the assembly slot 105 is vacant or empty, the permanent slot 104 fitted with a removable permanent fastener 124, and the disassembly slot 106 fitted with a disassembly fastener 126. As shown in FIG. 2 the horizontal arm 107 is collapsed downward into the vertical post 103 within the rectangular cut-out 110 portion.

Figure 4:
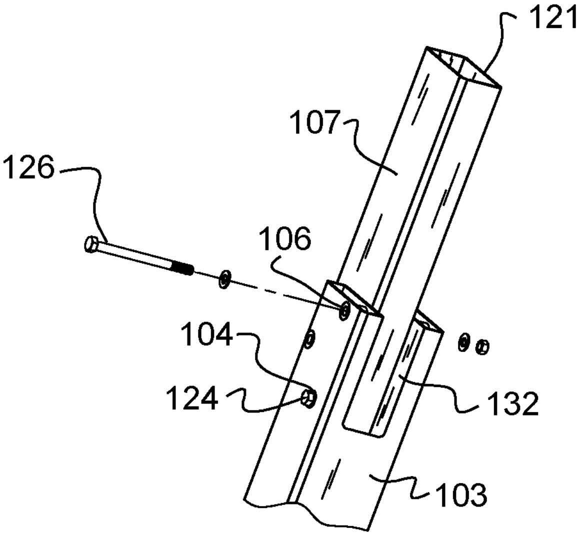
FIG. 4 is an exploded view of the top portion of the sign post body as disassembled.

FIG. 4 is an exploded view of the top portion of the body as disassembled. In one embodiment of the disclosure during a disassembled status, the horizontal arm 107 is collapsed downward into the vertical post 103 and wherein the permanent fastener 124 is a in place to keep the horizontal arm 107 and the vertical post 103 interconnected, and a disassembly fastener 126 is placed into the disassembly slot 106 to complete locking of the horizontal arm 107 with the vertical post 103 during disassembly. In another embodiment of the disclosure during a disassembled state, the horizontal arm 107 is collapsed downward into the vertical post 103 and wherein the permanent fastener 124 within a permanent slot 104 is in place to keep the horizontal arm 107 and the vertical post 103 interconnected, a disassembly fastener 126 is placed into the disassembly slot 106, and an assembly fastener 125 may be placed into the assembly slot 105 to complete locking of the horizontal arm 107 with the vertical post 103 during disassembly.

Figure 5:
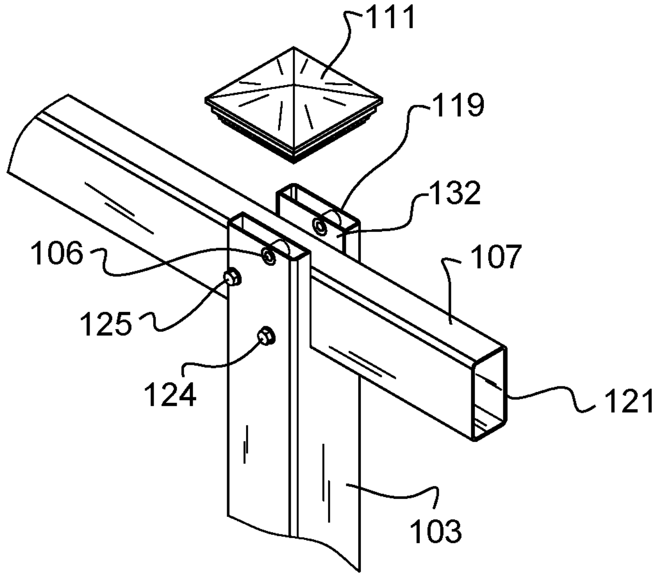
FIG. 5 is an exploded view of the top portion of the sign post body as assembled.

FIG. 5 is an exploded view of the top portion of the body as assembled. In one embodiment of the disclosure during an assembled status, the horizontal arm 107 is elevated into a horizontal alignment with respect to the vertical post 103, the backend of the horizontal arm 121 protruding outward perpendicular to the vertical post 103. In addition, the vertical post component has a backend rectangular cut-out along upper cavity of top portion of vertical post 103 to allow the arrangement of the horizontal arm to be horizontally arranged within the vertical post component's inner cavity. In another embodiment of the disclosure during an assembly state, the horizontal arm 107 is arranged perpendicular to the vertical post 103 and wherein the permanent fastener 124 within a permanent slot 104 is in place to keep the horizontal arm 107 and the vertical post 103 interconnected, a disassembly fastener 126 may be in placed into the disassembly slot 106, and an assembly fastener 125 is in place into the assembly slot 105 to complete locking of the horizontal arm 107 with the vertical post 103 during assembly.

In order to maintain the horizontal arm 107 into a fixed horizontal position, at least two fastening mechanism need to be engaged and in place including, the permanent fastener 124, and the assembly fastener 125. It's assumed that the disassembly fastener 126 has been disengaged or removed leaving the disassembly slot 106 empty or void of fastener mechanism. The cap 111 is placed along the top end of vertical post 119 to provide a more polished and elegant design esthetic.

Figure 6B:
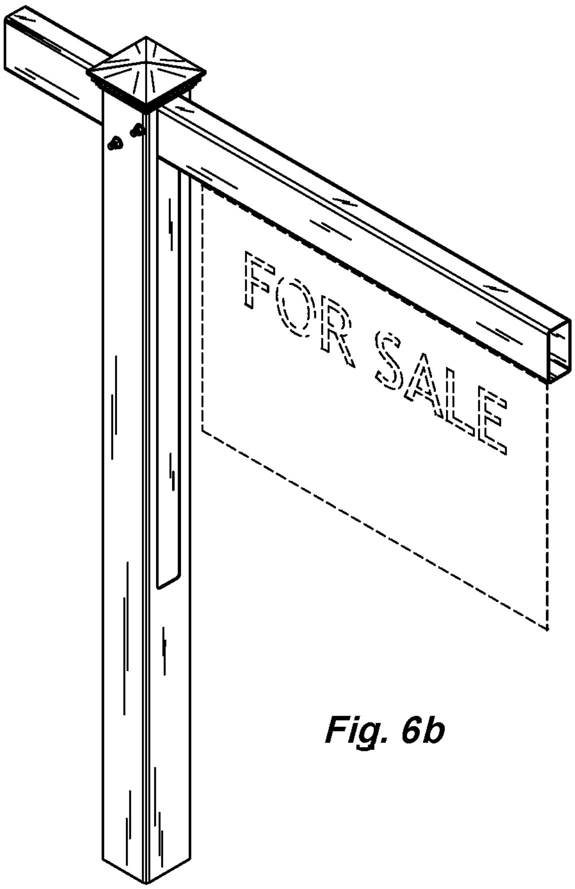
FIG. 6*b* is a prospective view of the sign post apparatus during disassembled state
Figure 6A:
FIG. 6*a* is a prospective view of the sign post apparatus during assembled state

FIG. 6*a* illustrates a prospective view of the sign post apparatus during assembled state.

FIG. 6*b* illustrates a prospective view of the sign post apparatus during disassembled state.

Figure 7:
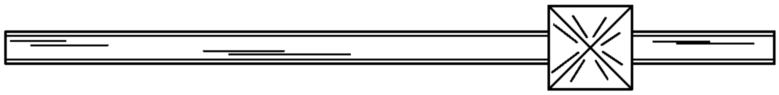
FIG. 7 is top view of the sign post apparatus during assembled state

FIG. 7 illustrates top view of the sign post apparatus during assembled state.

Figure 8:
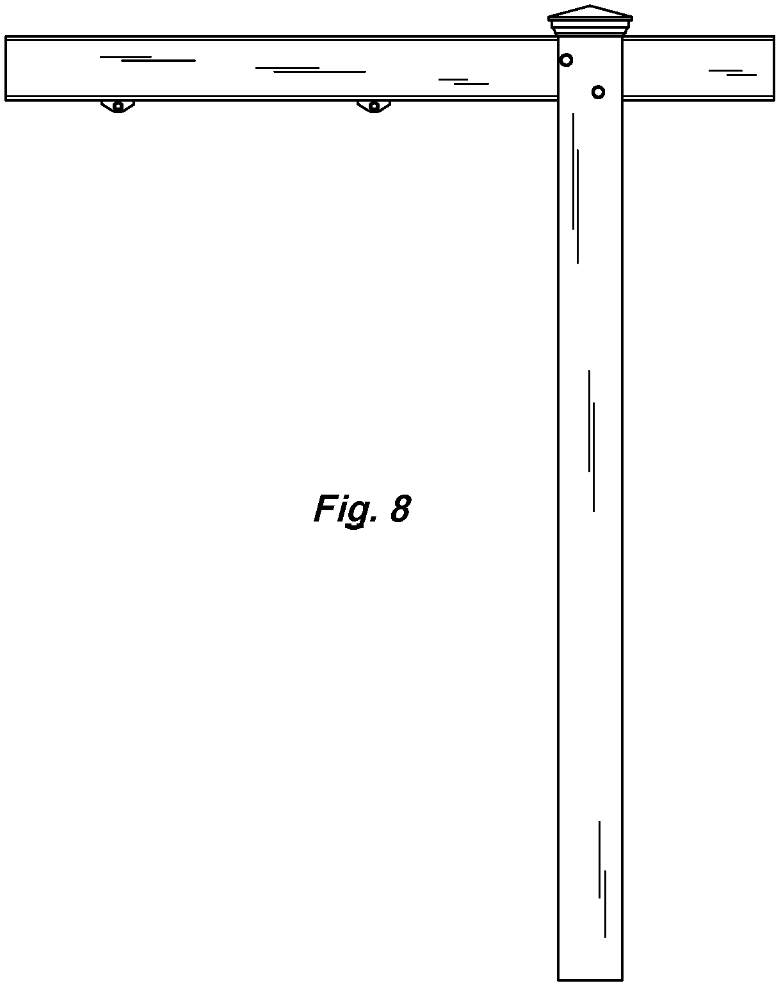
FIG. 8 is a back view of the sign post apparatus during assembled state

FIG. 8 illustrates a back view of the sign post apparatus during assembled state.

Figure 9:
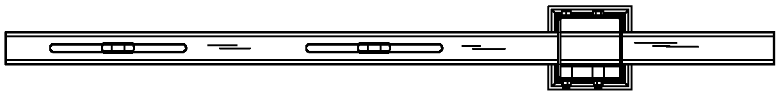
FIG. 9 is a bottom view of the sign post apparatus during assembled state

FIG. 9 illustrates a bottom view of the sign post apparatus during assembled state.

Figure 10:
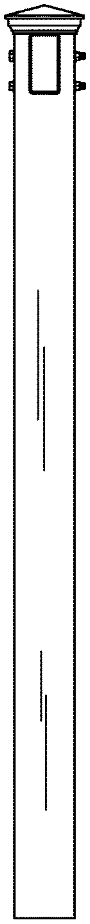
FIG. 10 is a left side view of the sign post apparatus during assembled state

FIG. 10 illustrates a left side view of the sign post apparatus during assembled state.

Figure 11:
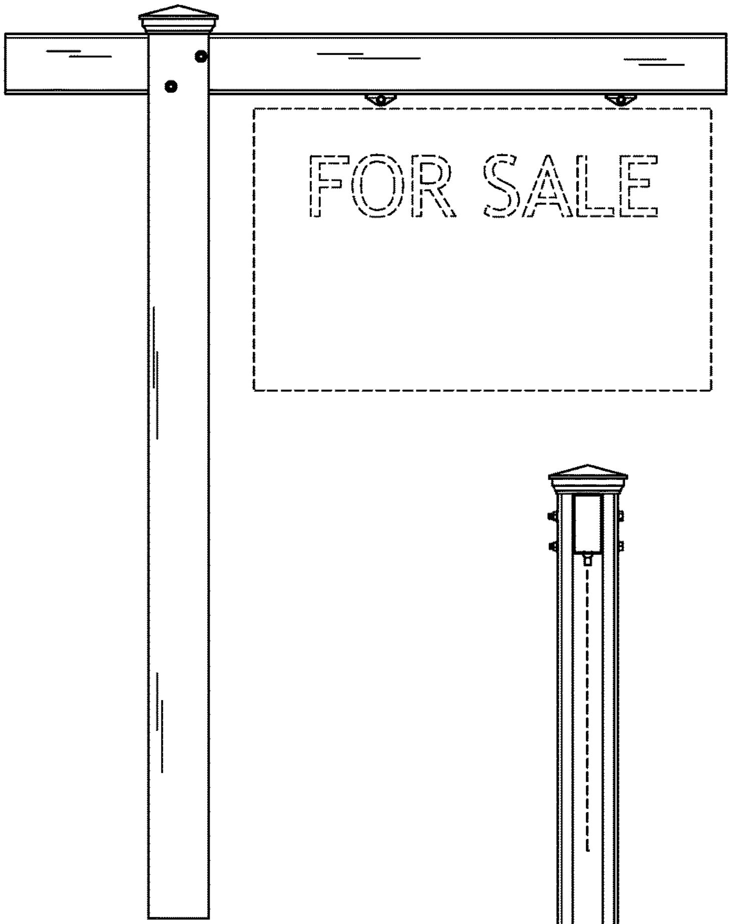
FIG. 11 is front view of the sign post apparatus during assembled state

FIG. 11 illustrates front view of the sign post apparatus during assembled state.

Figure 12:
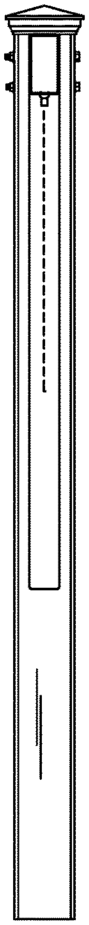
FIG. 12 is a right side view of the sign post apparatus during assembled state

FIG. 12 illustrates a right side view of the sign post apparatus during assembled state.

FIG. 13 illustrates a top view of the sign post apparatus during disassembled state.

FIG. 14 illustrates a back view of the sign post apparatus during disassembled state.

FIG. 15 illustrates a bottom view of the sign post apparatus during disassembled state.

Figure 16:
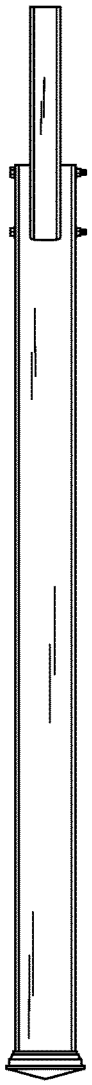
FIG. 16 is a left side view of the sign post apparatus during disassembled state

FIG. 16 illustrates a left side view of the sign post apparatus during disassembled state.

Figure 17:
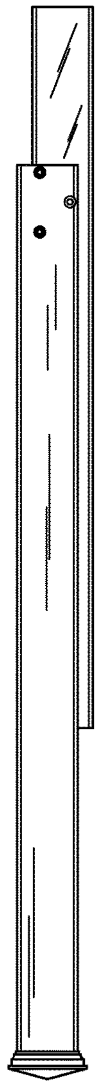
FIG. 17 is a front view of the sign post apparatus during disassembled state

FIG. 17 illustrates a front view of the sign post apparatus during disassembled state.

Figure 18:
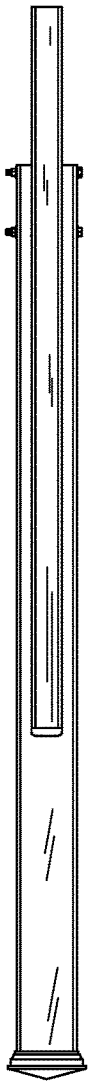
FIG. 18 is a right side view of the sign post apparatus during disassembled state

FIG. 18 illustrates a right side view of the sign post apparatus during disassembled state.

Figure 19:
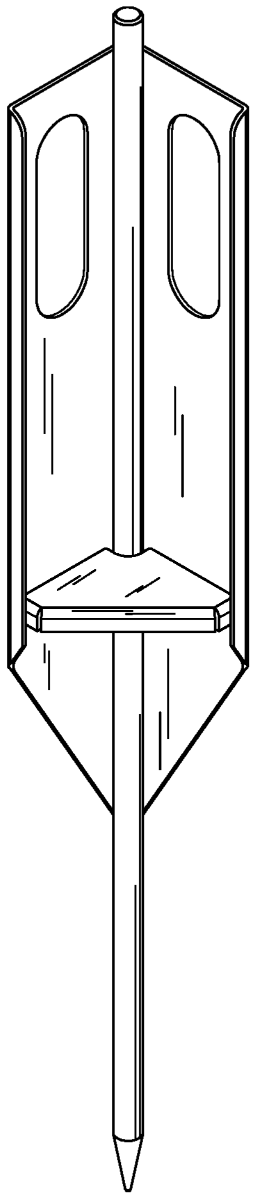
FIG. 19 is a prospective view of the ground stake apparatus

FIG. 19 illustrates a prospective view of the ground stake apparatus.

FIG. 20 illustrates a top view of the ground stake apparatus.

FIG. 21 illustrates a front right side view of the ground stake apparatus.

FIG. 22 illustrates a bottom view of the ground stake apparatus.

Figure 23:
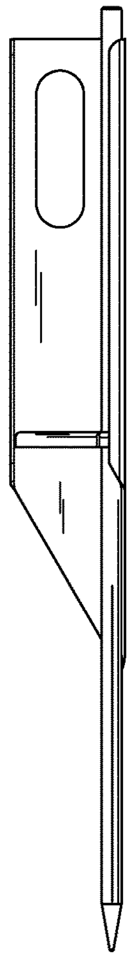
FIG. 23 is a front left side view of the ground stake apparatus

FIG. 23 illustrates a front left side view of the ground stake apparatus.

Figure 24:
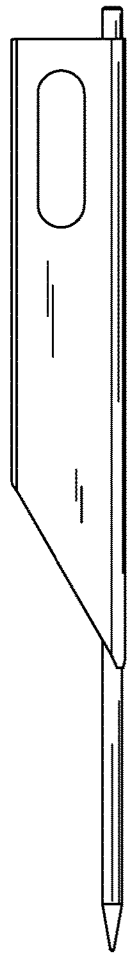
FIG. 24 is a back view of the right side of the ground stake apparatus

FIG. 24 is a back view of the right side of the ground stake apparatus.

Figure 25:
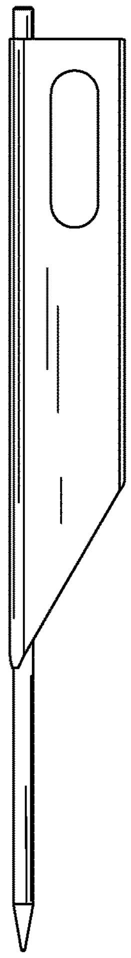
FIG. 25 is a back view of the left side of the ground stake apparatus

FIG. 25 illustrates a back view of the left side of the ground stake apparatus.

Although this invention has been described in terms of certain preferred embodiments, other embodiments that are apparent to those of ordinary skill in the art, including embodiments which do not provide all of the benefits and features set forth herein, are also within the scope of this invention. Accordingly, the scope of the present invention is defined only by references to the appended claims.

What is claimed is:

1. A sign post apparatus, comprising:
a horizontal tubular member;
a vertical tubular member, comprising:
an inner side with a rectangular cut out along the top portion of the vertical tubular member to allow the horizontal tubular member pin joint connected to the vertical tubular member to be collapsed downward and disposed within the inner side of the vertical tubular member;
a first fastener permanently affixed creating a pin joint connecting the vertical tubular member to the horizontal tubular member;
a disassembled slot that allows a removable fastener to be inserted therein in order to allow the horizontal tubular member to be arranged and locked into place in parallel arrangement to the vertical tubular member for proper disassembly and storage;
a removable cap member that is affixed at the top end of the vertical tubular member during assembly and affixed at bottom end of the vertical tubular member to secure the storage of a stake during disassembly and storage;
wherein the stake, comprising:
a nail member having a dull end and a sharp end on the opposite side intended to be enclosed along a bottom end of the vertical tubular member during disassembly;
a support mechanism, comprising:
two symmetrical and vertical support members perpendicular to one another having a rectangular top portion and a triangular bottom portion with its hypotenuse extending from the outside bottom corner of the rectangular top portion towards to nail member, the symmetrical and vertical support members extending outward from a top portion of the nail member;
two vertical inward side member arranged perpendicular to and along an outward side of each of the two symmetrical and vertical support members;
a horizontal support member arranged horizontally between the symmetrical and vertical two support members along a bottom portion of the rectangular top portion of the two symmetrical and vertical support members.

2. The apparatus of claim 1, wherein the horizontal tubular member further comprising at least two adjustable clips arranged along the bottom side of the horizontal tubular member that allow for attachment of an external sign.

3. The apparatus of claim 1, wherein the stake is comprised of steel.

4. The apparatus of claim 1, wherein the two symmetrical and vertical support members have oval cut outs along a rectangular top portion of the two support members.

5. A sign post apparatus, comprising:
a horizontal tubular member, comprising:
at least two adjustable clips arranged horizontally along the bottom side of the horizontal tubular member that allow for attachment of an external sign;
a vertical tubular member, comprising:
an inner side with a rectangular cut out along the top portion of the vertical tubular member to allow the horizontal tubular member pin joint connected to the vertical tubular member to be collapsed downward and disposed within the inner side of the vertical tubular member;
a permanent slot that permits a first removable fastener to be inserted therein in order to create a pin joint connecting the vertical tubular member to the horizontal tubular member;
an assembled slot that permits a second removable fastener to be inserted and locked therein in order to allow the horizontal tubular member to be arranged perpendicular to the vertical tubular member for proper assembly;
a disassembled slot that permits the second removable fastener to be inserted therein in order to allow the horizontal tubular member to be arranged and locked into place in parallel arrangement to the vertical tubular member for proper disassembly and storage; and
a stake, the stake comprising: a dull end intended to be enclosed by the vertical tubular member and a sharp end on the opposite side intended to be buried into the ground during assembly.

6. The apparatus of claim 5, further comprising a stake, the stake comprising:
a nail member having a dull end intended to be enclosed by the vertical tubular member and a sharp end on the opposite side;
a support mechanism, comprising:
two symmetrical and vertical support members perpendicular to one another extending outward from a top portion of the nail member and a triangular bottom portion;
two vertical inward side member arranged perpendicular to and along an outward side of each of the two support members;

a horizontal support member arranged horizontally between the two support members along a bottom portion of the rectangular top portion of the two support members.

7. The apparatus of claim 5, further comprising a removable cap member that is affixed at top end of the vertical tubular member during assembly and affixed at bottom end of the vertical tubular member during disassembly and storage.

8. The apparatus of claim 6, wherein the support members have oval cut outs along the top portion of the two support members.

9. A sign post apparatus, comprising:

a horizontal tubular member, comprising:

at least two attachment means arranged along the bottom side of the horizontal tubular member that allow for attachment of an external sign;

a vertical tubular member, comprising:

an inner side with a rectangular cut out along a top portion of the vertical tubular member to allow the horizontal tubular member pin joint connected to the vertical tubular member to be collapsed downward and disposed within the inner side of the vertical tubular member;

a first fastener permanently affixed creating a pin joint connecting the vertical tubular member to the horizontal tubular member;

an assembled slot that allows a removable fastener to be inserted and fastened therein in order to allow the horizontal tubular member to be arranged perpendicular to the vertical tubular member for proper assembly;

a stake, comprising:

a dull end intended to be enclosed by the vertical tubular member and;

a sharp end on the opposite side intended to be buried into the ground during assembly.

10. The apparatus of claim 9, wherein the stake further comprising: a support mechanism, comprising:

two symmetrical and vertical support members perpendicular to one another extending outward from a top portion of the nail member having oval cut outs along a rectangular top portion of the two support members intended to be encapsulated by the bottom portion of the vertical tubular member, and a triangular bottom portion intended to be buried into the ground during assembly.

11. The apparatus of claim 9, wherein the vertical tubular member further comprising: a disassembled slot that allows the removable fastener to be inserted therein in order to allow the horizontal tubular member to be arranged and fastened into place in parallel arrangement to the vertical tubular member for proper disassembly and storage.

12. The apparatus of claim 9, further comprising: a removable top member that is affixed at top end of the vertical tubular member.

13. The apparatus of claim 12, wherein the removable top member can be affixed within inner hollow cavity of bottom end of the vertical tubular member.

14. The apparatus of claim 10, wherein the support mechanism further comprising:

two symmetric and vertical inward side member arranged perpendicular to and along an outward side of each of the two support members intended to maintain the stability of the vertical tubular member;

a horizontal support member arranged horizontally between the two symmetrical and vertical support members and the two inward side members along a bottom side of the rectangular top portion of the two support members intended to limit the depth for which the stake may be buried into the ground during assembly.

15. The apparatus of claim 9, wherein the stake is comprised of at least one from the group consisting of coated, painted or galvanized steel.

16. The apparatus of claim 9, further comprising: a disassembly slot devoid of the removable fastener.

17. The apparatus of claim 1, further comprising: an assembly slot devoid of the removable fastener.

18. The apparatus of claim 1, wherein the vertical tubular member having a hollow inner cavity along its bottom portion to secure complete storage of the stake in its entirety.

19. The apparatus of claim 5, wherein the at least two adjustable clips may be arranged horizontally in varying lengths from one another to permit the attachment of external signs of varying sizes.

* * * * *